United States Patent
Li et al.

(10) Patent No.: US 12,450,410 B2
(45) Date of Patent: Oct. 21, 2025

(54) PRODUCT STATE QUANTIFICATION AND REMAINING LIFE PREDICTION METHOD, AND APPARATUS AND SYSTEM

(71) Applicant: Siemens Aktiengesellschaft, Munich (DE)

(72) Inventors: Chao Chun Li, Shanghai (CN); Xiao Zhou Zhou, Beijing (CN); Huan Lun Li, Jiangsu (CN); Ling Fu, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/564,141

(22) PCT Filed: May 27, 2021

(86) PCT No.: PCT/CN2021/096502
§ 371 (c)(1),
(2) Date: Nov. 27, 2023

(87) PCT Pub. No.: WO2022/246758
PCT Pub. Date: Dec. 1, 2022

(65) Prior Publication Data
US 2024/0281578 A1    Aug. 22, 2024

(51) Int. Cl.
*G06F 30/28* (2020.01)
(52) U.S. Cl.
CPC .................... *G06F 30/28* (2020.01)
(58) Field of Classification Search
CPC .................. G06F 30/28; G06F 30/20
See application file for complete search history.

(56) References Cited

U.S. PATENT DOCUMENTS

| | | | |
|---|---|---|---|
| 2005/0005186 A1 | 1/2005 | Goebel | 714/1 |
| 2010/0153080 A1 | 6/2010 | Khan et al. | 703/7 |

(Continued)

FOREIGN PATENT DOCUMENTS

| | | | |
|---|---|---|---|
| CN | 106 089 753 | 11/2016 | F04D 15/00 |
| CN | 106 777 577 | 5/2017 | G06F 17/50 |

(Continued)

OTHER PUBLICATIONS

"Data Fusion" Wikipedia, archived by the Internet Archive Wayback Machine on May 15, 2021, retrieved from https://web.archive.org/web/20210515213628/https://en.wikipedia.org/wiki/Data_fusion on Jun. 8, 2024 (Year: 2021).*

(Continued)

*Primary Examiner* — Rehana Perveen
*Assistant Examiner* — Troy A Maust
(74) *Attorney, Agent, or Firm* — Slayden Grubert Beard PLLC (57) ABSTRACT

A product state quantification and remaining life prediction method, the method comprising:
T1, acquiring design data and operating data of a product;
T2, establishing a design model of the product on the basis of the design data, performing data fusion according to the design data and operating data to obtain a predicted performance curve of the product, and selecting an optimized operating state point in the predicted performance curve; and
T3, establishing a cost model and an operating flexibility model of the product on the basis of the predicted performance curve, and calculating a remaining life prediction of the product according to a performance demand or operating cost of the product.

10 Claims, 7 Drawing Sheets

(56) References Cited

U.S. PATENT DOCUMENTS

| | | | |
|---|---|---|---|
| 2012/0143564 A1 | 6/2012 | Li | 702/179 |
| 2014/0271106 A1 | 9/2014 | Alessandro et al. | 415/1 |
| 2019/0187640 A1* | 6/2019 | Fowler | F04D 27/001 |
| 2019/0287005 A1 | 9/2019 | Subramaniyan et al. | |
| 2019/0384870 A1 | 12/2019 | Shiraishi et al. | |

FOREIGN PATENT DOCUMENTS

| | | | |
|---|---|---|---|
| CN | 110259702 A | 9/2019 | F04D 15/00 |
| JP | 2012511669 A | 5/2012 | F01D 25/00 |
| JP | 2014177936 A | 9/2014 | F04B 49/10 |
| JP | 2016161285 A | 9/2016 | G01M 99/00 |
| JP | 2020013557 A | 1/2020 | G06Q 40/08 |
| WO | 2006/039743 A1 | 4/2006 | F04B 51/00 |

OTHER PUBLICATIONS

"Pump Life Cycle Costs: A Guide to LCC Analysis for Pumping Systems", Jan. 2001, retrieved from https://www.energy.gov/eere/amo/articles/pump-life-cycle-costs-guide-lcc-analysis-pumping-systems-executive-summary on Jun. 9, 2024 (Year: 2001).*

"Data cleaning: The benefits and steps to creating and using clean data", Tableau, archived by the Internet Archive Wayback Machine on Apr. 11, 2021, retrieved from https://web.archive.org/web/20210411183450/https://www.tableau.com/learn/articles/what-is-data-cleaning on Jun. 11, 2024 (Year: 2021).*

Bergs et al. "Novel method for online wear estimation of centrifugal pumps using multi-fidelity modeling" IEEE (Year: 2019).*

Eaton et al. "On the Performance Degradation of Centrifugal Pumps" (Year: 2018).*

Search Report for International Application No. PCT/CN2021/096502, 11 pages, Sep. 14, 2021.

Japanese Office Action, Application No. 2023573001, 15 pages, Sep. 11, 2024.

Extended European Search Report, Application No. 21942334.0, 11 pages, Jan. 20, 2025.

* cited by examiner

PRODUCT STATE QUANTIFICATION AND REMAINING LIFE PREDICTION METHOD, AND APPARATUS AND SYSTEM

CROSS-REFERENCE TO RELATED APPLICATIONS

This application is a U.S. National Stage Application of International Application No. PCT/CN2021/096502 filed May 27, 2021, which designates the United States of America, the contents of which are hereby incorporated by reference in their entirety.

TECHNICAL FIELD

The present disclosure relates to the field of industrial digitization. Some embodiments of the teachings herein include product state quantification and remaining life prediction methods, apparatus, and systems.

BACKGROUND

Many entities (such as water plant owners) have their own pump facilities, and only consider the initial purchase and installation costs of the pump system. For production line designers or managers, assessing the effectiveness of different schemes before installing major new equipment or performing major maintenance is essential work. Such assessment will verify the most economically attractive choice. However, pump effectiveness gradually falls over the entire life cycle or in the course of suffering failures, and this will result in losses due to water being cut off and unexpectedly turned off.

National and global markets will continue to become more competitive, so production line owners need to continuously search for cost reductions, in order to improve their operating profit margins. Since reducing the sources of costs is in particular minimizing energy consumption and production line shutdown periods, production line equipment operation will be followed with interest. Therefore, customers or owners wish to know the current performance state and maintain a useful quantitative service life for pump maintenance and replacement services.

Thus, there are still many challenges for quantifying pump performance and remaining service life. For example, pump deterioration is caused by many factors, including mechanical, hydraulic, electromagnetic, vibration and temperature factors, etc., making it difficult to establish a physical model. For example, due to a lack of sensors or being effective in only one short time period, operating data generally cannot be completed. As another example, detailed design data of the pump generally cannot be used, e.g. drawings.

SUMMARY

Some embodiments of the teachings herein include a product state quantification and remaining life prediction method, comprising: T1, acquiring design data and operating data of a product; T2, establishing a design model of the product on the basis of the design data, performing data fusion according to the design data and operating data to obtain a predicted performance curve of the product, and selecting an optimized operating state point in the predicted performance curve; and T3, establishing a cost model and an operating flexibility model of the product on the basis of the predicted performance curve, and calculating a remaining life prediction of the product according to a performance demand or operating cost of the product.

In some embodiments, the product is a water pump, and T2 further comprises: T21, subjecting design data and operating data of the water pump to data pre-processing, to remove abnormal data and erroneous data; T22, establishing a design model of the water pump on the basis of the design data, and performing design performance evaluation and analysis of the product according to the design model, wherein the design model is a multi-fidelity digital twin model; T23, using a data fusion algorithm to perform data fusion according to the design data and operating data to obtain a predicted performance curve of the water pump, and increasing the accuracy of the predicted performance curve by optimizing parameters of the data fusion algorithm; and T24, calculating an optimized matching relationship within an increased operation range between a load of the water pump and its power and efficiency and simultaneously satisfying the water pump, so as to select an optimized operating state point in the predicted performance curve.

In some embodiments, T3 further comprises: T31, performing a regressive calculation on the basis of the predicted performance curve to generate a performance decline model of a water pump; T32, modeling a cost of the product on the basis of the performance decline model, to calculate a total life cycle economic cost of the product and a replacement cost of the product; T33, using an optimization algorithm to calculate a replacement time of the water pump, on the basis of the performance decline model, and operating data and cost parameters of the water pump; and T34, calculating an operating flexibility of the water pump on the basis of full-load operating parameters and a decline function of the water pump.

In some embodiments, the data fusion algorithm is an MFK algorithm.

In some embodiments, the performance decline model of the pump is described, by means of a formula, as a model of head loss of a time sequence as follows:

$$P(t) = P^N - bt^c$$

where $P^N$ denotes initial performance, i.e. a design point when t=0, i.e. the performance of the water pump when it has just left the factory; b and c denote parameters used for curve fitting by the method of least squares.

In some embodiments, the total life cycle economic cost is:

$$LCC = C_{ic} + C_{in} + C_e + C_o + C_m + C_s + C_{env} + C_d$$

where $C_{ic}$ is the initial cost, $C_{in}$ is the installation cost, $C_e$ is the energy cost, $C_o$ is the system management cost, $C_m$ is the maintenance and repair cost, $C_s$ is the fault cost, $C_{env}$ is the environmental cost, and $C_d$ is the dismantling and processing cost.

In some embodiments, the replacement cost is:

$$\begin{aligned} RC &= (LCC_{rep} - LCC_{original})|_{T_o}^{T_{end}} \\ &= (C_{ic} + C_{in} + C_d + C_o + C_m + C_s + C_{env}) * \left(\frac{T_{end} - T_{rep}}{T_{rep}}\right) \\ &\quad + (C_{e,rep} - C_{e,original}) + (C_{res,original} - C_{res,rep}), \end{aligned}$$

where $LCC_{rep}$ is the total life cycle economic cost of new water pump replacement, $LCC_{original}$ is the total life cycle economic cost of an old water pump, wherein $T_{end}$ is the time when the old water pump's use cycle expires, $T_{rep}$ is the time of new water pump replacement, $C_{e.rep}$ is the energy cost of new water pump replacement, $C_{res,rep}$ is the energy cost of using the new water pump, $C_{res,original}$ is the remaining value of the old water pump, and $C_{res,rep}$ is the remaining value of the new water pump, wherein the energy costs $C_{e,original}$ and $C_{e.rep}$ can be calculated by multiplying the energy power consumption by the price of electricity, $$C_{e,orginal} - C_{e,rep} = \int_{N_{min}}^{N_{max}} \int_{Q_{min}}^{Q_{max}} \left( \int_{t_{min}+\Delta t}^{t_{end}} P_E(t, Q, N) \cdot \text{Density}(Q, N) dt - \int_{0}^{t_{end}-t_{now}-\Delta t} P_E(t, Q, N) \cdot \text{Price}_E(t) \cdot \text{Dentiy}(Q, N) dt \right) dQ dN$$

where Q is the water pump flow rate, N is the water pump rotation speed, Density(Q,N) is the joint probability density function of the water pump flow rate and the rotation speed, $P_E(t,Q,N)$ is the power updated by a power decline model at different water pump flow rates and rotation speeds, and $Price_E(t)$ is the predicted price of electricity with time as a variable.

In some embodiments, the full-load operating parameters comprise a minimum demand $Q_d$ of the water pump flow rate and a minimum head demand $H_d$, wherein $f_1(\Delta t)$ represents the water pump head operating flexibility, and $f_2(\Delta t)$ represents the water pump flow rate operating flexibility:

$$f_1(\Delta t) = |H(\Delta t) - H_d|$$
$$f_2(\Delta t) = |Q(\Delta t) - Q_d|$$

when the water pump head operating flexibility $f_1(\Delta t)$ or the water pump flow rate operating flexibility $f_2(\Delta t)$ is less than a predetermined threshold, it is necessary to send a prompt that the water pump needs replaced.

As another example, some embodiments of the teachings herein include a product state quantification and remaining life prediction system, comprising: a processor; and a memory coupled to the processor, the memory having an instruction stored therein which, when executed by the processor, causes the electronic device to perform actions comprising: T1, acquiring design data and operating data of a product; T2, establishing a design model of the product on the basis of the design data, performing data fusion according to the design data and operating data to obtain a predicted performance curve of the product, and selecting an optimized operating state point in the predicted performance curve; and T3, establishing a cost model and an operating flexibility model of the product on the basis of the predicted performance curve, and calculating a remaining life prediction of the product according to a performance demand or operating cost of the product.

In some embodiments, the product is a water pump, and the action T2 further comprises: T21, subjecting design data and operating data of the water pump to data pre-processing, to remove abnormal data and erroneous data; T22, establishing a design model of the water pump on the basis of the design data, and performing design performance evaluation and analysis of the product according to the design model, wherein the design model is a multi-fidelity digital twin model; T23, using a data fusion algorithm to perform data fusion according to the design data and operating data to obtain a predicted performance curve of the water pump, and increasing the accuracy of the predicted performance curve by optimizing parameters of the data fusion algorithm; and T24, calculating an optimized matching relationship within an increased operation range between a load of the water pump and its power and efficiency and simultaneously satisfying the water pump, so as to select an optimized operating state point in the predicted performance curve.

In some embodiments, the action T3 further comprises: T31, performing a regressive calculation on the basis of the predicted performance curve to generate a performance decline model of a water pump; T32, modeling a cost of the product on the basis of the performance decline model, to calculate a total life cycle economic cost of the product and a replacement cost of the product; T33, using an optimization algorithm to calculate a replacement time of the water pump, on the basis of the performance decline model, and operating data and cost parameters of the water pump; and T34, calculating an operating flexibility of the water pump on the basis of full-load operating parameters and a decline function of the water pump.

In some embodiments, the data fusion algorithm is an MFK algorithm.

In some embodiments, the performance decline model of the pump is described, by means of a formula, as a model of head loss of a time sequence as follows:

$$P(t) = P^N - bt^c$$

where $P^N$ denotes initial performance, i.e. a design point when t=0, i.e. the performance of the water pump when it has just left the factory; b and c denote parameters used for curve fitting by the method of least squares.

Further, the total life cycle economic cost is:

$$LCC = C_{ic} + C_{in} + C_e + C_o + C_m + C_s + C_{env} + C_d$$

where $C_{ic}$ is the initial cost, $C_{in}$ is the installation cost, $C_e$ is the energy cost, $C_o$ is the system management cost, $C_m$ is the maintenance and repair cost, $C_s$ is the fault cost, $C_{env}$ is the environmental cost, and $C_d$ is the dismantling and processing cost.

In some embodiments, the replacement cost is:

$$RC = (LCC_{rep} - LCC_{original})|_{T_o}^{T_{end}}$$
$$= (C_{ic} + C_{in} + C_d + C_o + C_m + C_s + C_{env}) * \left(\frac{T_{end} - T_{rep}}{T_{rep}}\right) + (C_{e,rep} - C_{e,original}) + (C_{res,original} - C_{res,rep}),$$

where $LCC_{rep}$ is the total life cycle economic cost of new water pump replacement, $LCC_{original}$ is the total life cycle economic cost of an old water pump, wherein $T_{end}$ is the time when the old water pump's use cycle expires, $T_{rep}$ is the time of new water pump replacement, $C_{e.rep}$ is the energy cost of new water pump replacement, $C_{res,rep}$ is the energy cost of using the new water pump, $C_{res,original}$ is the remaining value of the old water pump, and $C_{res,rep}$ is the remaining value of the new water pump, wherein the energy costs $C_{e,original}$ and $C_{e,rep}$ can be calculated by multiplying the energy power consumption by the price of electricity, $$C_{e,original} - C_{e,rep} =$$

$$\int_{N_{min}}^{N_{max}} \int_{Q_{min}}^{Q_{max}} \left( \int_{t_{now}+\Delta t}^{t_{end}} P_g(t, Q, N) \cdot \text{Price}_E(t) \cdot \text{Density}(Q, N) \, dt - \int_D^{t_{end}-t_{now}-\Delta t} P_E(t, Q, N) \cdot \text{Price}_E(t) \cdot \text{Dentiy}(Q, N) dt \right) dQ \, dN$$

where Q is the water pump flow rate, N is the water pump rotation speed, Density(Q,N) is the joint probability density function of the water pump flow rate and the rotation speed, $P_E(t,Q,N)$ is the power updated by a power decline model at different water pump flow rates and rotation speeds, and $\text{Price}_E(t)$ is the predicted price of electricity with time as a variable.

In some embodiments, the full-load operating parameters comprise a minimum demand $Q_d$ of the water pump flow rate and a minimum head demand $H_d$, wherein $f_1(\Delta t)$ represents the water pump head operating flexibility, and $f_2(\Delta t)$ represents the water pump flow rate operating flexibility.

$$f_1(\Delta t) = |H(\Delta t) - H_d|$$

$$f_2(\Delta t) = |Q(\Delta t) - Q_d|$$

when the water pump head operating flexibility $f_1(\Delta t)$ or the water pump flow rate operating flexibility $f_2(\Delta t)$ is less than a predetermined threshold, it is necessary to send a prompt that the water pump needs replaced.

As another example, some embodiments include a product state quantification and remaining life prediction apparatus, comprising: an acquisition apparatus, which acquires design data and operating data of a product; a fusion apparatus, which establishes a design model of the product on the basis of the design data, performs data fusion according to the design data and operating data to obtain a predicted performance curve of the product, and selects an optimized operating state point in the predicted performance curve; a calculation apparatus, which establishes a cost model and an operating flexibility model of the product on the basis of the predicted performance curve, and calculates a remaining life prediction of the product according to a performance demand or operating cost of the product.

As another example, some embodiments include a computer program product, tangibly stored on a computer-readable medium and comprising a computer-executable instruction which, when executed, causes at least one processor to perform one or more of the methods described herein.

As another example, some embodiments include a computer-readable medium, having stored thereon a computer-executable instruction which, when executed, causes at least one processor to perform one or more of the methods described herein.

The product state quantification and remaining life prediction mechanisms incorporating teachings of the present disclosure is reliable and precise, and can perform quantification and prediction on the basis of dynamic performance of a product. They may be especially suitable for water pumps and can quantify the water pump's dynamic performance state on the basis of a dynamic digital model of the water pump, and can quantify the water pump's remaining service life on the basis of a water pump decline model.

DETAILED DESCRIPTION

Specific embodiments of the teachings herein are described below with reference to the drawings. They include state quantification and remaining life prediction mechanisms, which is especially suitable for water pumps. In the present disclosure, based on digital twin technology, a model is established for design performance and predicted performance of a water pump. With reference to water pump operating data and a performance curve, this establishes a data-driven digital twin model of a water pump to assess the performance of the water pump during operation, in order to acquire a remaining life prediction for the water pump in terms of performance demands or operating costs. The teachings of the present disclosure are described below, taking a water pump as an example.

Some embodiments include a product state quantification and remaining life prediction method, comprising steps T1, T2 and T3.

Figure 5:
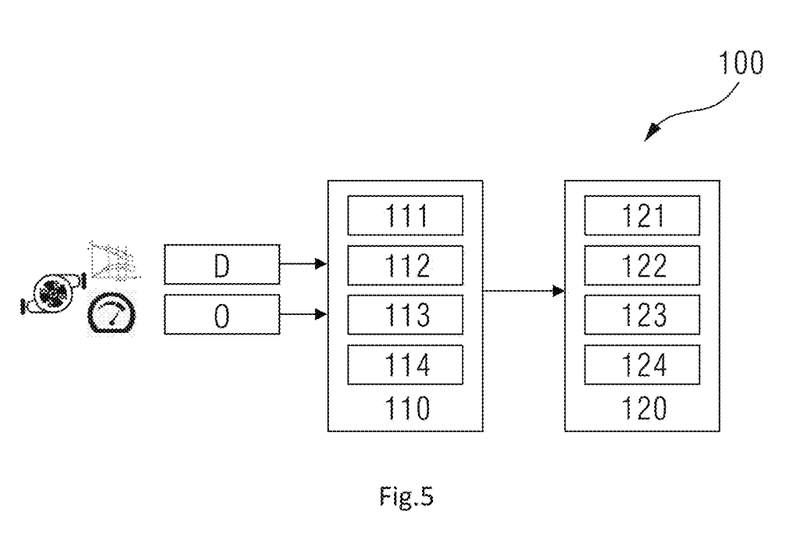
FIG. 5 is a schematic structural drawing of a product state quantification and remaining life prediction system according to an example embodiment incorporating teachings of the present disclosure.

FIG. 5 is a schematic structural drawing of a state quantification and remaining life prediction system according to an example embodiment incorporating teachings of the present disclosure. As shown in FIG. 5, an example product state quantification and remaining life prediction system 100 comprises a performance analysis apparatus 110 and a remaining service life prediction apparatus 120. Input data of the performance analysis apparatus 110 is design data D and operating data O of a water pump; output data is an optimized operating state point P.

Specifically, the performance analysis apparatus 110 comprises a data preprocessing apparatus 111, a design modeling apparatus 112, a data fusion apparatus 113 and an optimization apparatus 114. The performance analysis apparatus 110 outputs a predicted performance curve for the water pump to the remaining service life prediction apparatus 120, and the remaining service life prediction apparatus 120 outputs a remaining life prediction calculated on the basis of operating costs or performance demands of the water pump. Specifically, the remaining service life prediction apparatus 120 comprises a performance decline modeling apparatus 121, a cost modeling apparatus 122, a cost optimization apparatus 123 and an operating flexibility modeling apparatus 124.

Step T1 is performed first: acquiring design data and operating data of a product. In this embodiment, design data comprises water pump rotation speed, flow rate, pressure and power, etc., and operating data comprises water pump rotation speed, flow rate, pressure and power under different wear conditions. Design data means data values which are desired to be achieved when designing the water pump, i.e. idealized data. Operating data is the corresponding data produced when the water pump is actually operating, i.e. live data.

Figure 2:
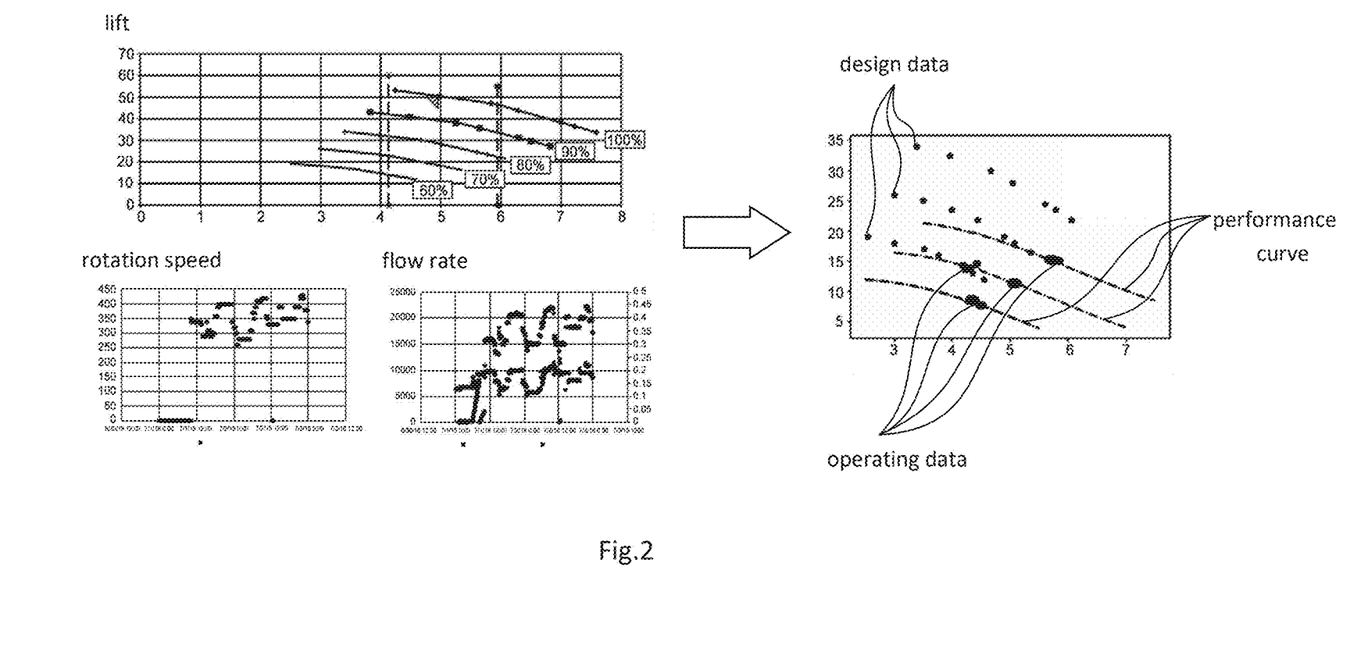
FIG. 2 is a schematic figure showing how performance curves are generated on the basis of water pump design data and operating data for product state quantification and remaining life prediction according to an example embodiment incorporating teachings of the present disclosure.

As an example, as shown in FIG. 2, in this embodiment, design data comprises water pump lift; the lift of a lift centrifugal pump is also called the pump head, and means the energy obtained by unit weight of fluid passing through the pump. The water pump lift depends on the pump structure, e.g. the impeller diameter, blade curvature, etc., and rotation speed. Precise theoretical calculation of the pump head is not possible, and it is generally determined by an experimental method. Operating data comprises water pump rotation speed and flow rate, wherein time sequence data is classified according to rotation speed.

Step T2 is then performed: the performance analysis apparatus 110 establishes a product design model on the basis of the design data, performs data fusion according to the design data and operating data to obtain a predicted performance curve of the product, and selects an optimized operating state point in the predicted performance curve.

In some embodiments, step T2 further comprises a sub-step T21, a sub-step T22, a sub-step T23 and a sub-step T24.

In sub-step T21, the data pre-processing apparatus 111 subjects the design data and operating data to data pre-processing, to remove abnormal data and erroneous data. The data pre-execution module collects water pump design data and execution data, and eliminates abnormal values. Specifically, abnormal values include using an algorithm to remove glitches, remove abnormal points, etc.

In sub-step T22, the design modeling apparatus 112 establishes a product design model on the basis of the design data, and performs design performance evaluation and analysis of the product according to the design model, wherein the design model is a multi-fidelity digital twin model. Design performance means the water pump's performance when it left the factory, so is idealized performance.

Specifically, in this embodiment, the multi-fidelity digital twin is a live performance digital twin comprising a water pump head curve, power curve and efficiency curve.

In some embodiments, a water pump performance digital twin model uses a multi-fidelity data-driven model. For a water pump, it has three different curves to assess performance, including a head curve, a power curve and an efficiency curve. These three types of curve are generally used for water pump selection in a water pump production line design stage. However, the abovementioned curves will not be used continuously in a downstream system operating process. The present invention combines water pump operating data with the water pump head curve, power curve and efficiency curve to establish a data-driven digital twin model of a water pump to assess the water-pump's performance during operation. Multi-fidelity modeling techniques are used in the abovementioned modeling process.

Figure 1:
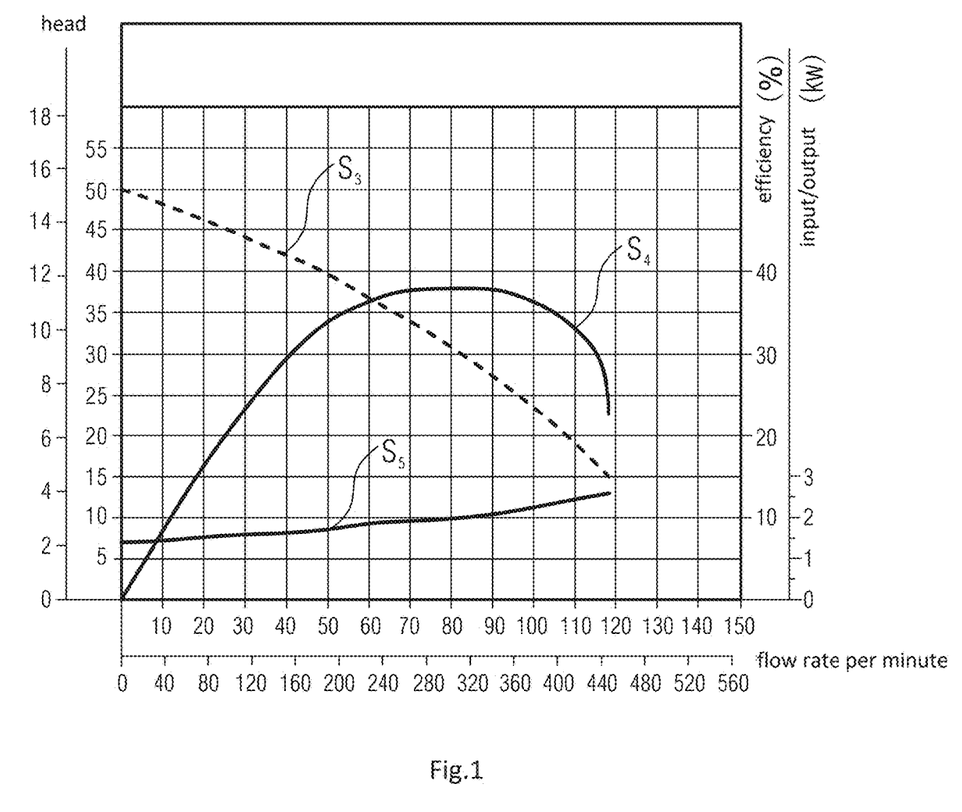
FIG. 1 is a head curve, a power curve and an efficiency curve of a water pump.

FIG. 1 shows a head curve, a power (power rate) curve and an efficiency curve of a water pump; on this basis, design model modeling of the water pump can be performed. Different fidelities of the model describe a dynamic system of the water pump. The vertical coordinates separately represent head, efficiency (%) and input/output (KW), while the horizontal coordinates are the flow rate of the water pump per minute; curve $S_3$ represents water pump performance, curve $S_4$ represents efficiency, and curve $S_5$ represents electric machine input (KW).

In step T23, the data fusion apparatus 113 uses a data fusion algorithm to perform data fusion according to the design data and operating data to obtain a predicted performance curve of the product, and increases the accuracy of the predicted performance curve by optimizing parameters of the data fusion algorithm.

FIG. 2 is a schematic figure showing how performance curves are generated on the basis of pump design data and operating data for state quantification and remaining life prediction according to an example embodiment of the teachings of the present disclosure. As shown in FIG. 2, in this embodiment, design data comprises water pump lift; the lift of a lift centrifugal pump is also called the pump head, and means the energy obtained by unit weight of fluid passing through the pump. The water pump lift depends on the pump structure, e.g. the impeller diameter, blade curvature, etc., and rotation speed.

Precise theoretical calculation of the pump head is not possible, and it is generally determined by an experimental method. Operating data comprises water pump rotation speed and flow rate, wherein time sequence data is classified according to rotation speed. Thus, performance curves of the water pump can be obtained by using an MFK (Multi-Fidelity Kriging) algorithm on the basis of the abovementioned design data and operating data. Specifically, as shown in the right-hand picture in FIG. 2, performance curves can be obtained by an MFK algorithm according to the abovementioned lift design data and rotation speed and flow rate operating data; as is known, when the water pump is used for a period of time, the actual data will show decline, and differ from the anticipated design data at the time the pump left the factory. If the process described above is performed iteratively, a historical performance curve and a real-time performance curve of the water pump will be obtained. In order to make the predicted performance curve and the actual performance curve consistent with one another, closer proximity of the operating data to the performance curve indicates more accurate prediction of the performance curve, so the accuracy of the predicted performance curve can be increased by optimizing parameters of the data fusion algorithm.

Taking an MFK algorithm as an example below, the steps of data fusion are explained. As shown in FIG. 1, $\mathcal{H}$ denotes an analytical or digital high-fidelity model operator; this is not real-time but is very detailed, high-fidelity and based on natural laws, and the index corresponding to $\mathcal{H}$ is H. $\mathcal{L}$ represents a lower-difficulty low-fidelity model operator; this is real-time, and describes the behaviour of $\mathcal{L}$, and the index corresponding to $\mathcal{L}$ is L. Equations thus generated for the abovementioned model also include corresponding model errors $\underline{w}_k^{H,L}$.

$$\underline{y}_k^H = \mathcal{H}(\hat{\underline{u}}_k, \underline{w}_k^H)$$

$$\underline{y}_k^L = \mathcal{L}(\hat{\underline{u}}_k, \underline{w}_k^L)$$

Taking a lower-fidelity model as an example, and using the state monitor method shown in FIG. 5, data fusion in the modeling is performed. ⊚ is a fusion operator. By using the previous measurement input $\hat{u}_{k-1}$ as an input of the low-fidelity model, and fusing it to actual test data $\hat{y}_k$, the output thereof can be estimated using the following formula:

$$\underline{w}_k^{H,L}$$

Gaussian process regression is used to fuse information from low-fidelity models (LHM) and high-fidelity models (HFM). $f(x) \sim GP(m(x), k(x,x'))$ can be described using an input vector x, a mean function m(x) and covariance function k(x,x').

A sub-element model method is also called Co-Kriging in the geostatistics field. In particular, the present invention considers four different Co-Kriging methods, using $x_1$ as an LFM input vector, $x_2$ as an HFM input vector, and $f_1$ and $f_2$ as respective function values:

$$x := \begin{bmatrix} x_1 \\ x_2 \end{bmatrix}, f := \begin{bmatrix} f_1 \\ f_2 \end{bmatrix}$$

The method mentioned above differs in the GP covariance matrix and summation function: autoregressive Co-Kriging (ARCK), deep multi-fidelity Gaussian processes (DMGP), Simple C-Kriging (SCK) and simple multi-fidelity Gaussian processes (SMGP). The above are described as:

$$\begin{bmatrix} f_1 \\ f_2 \end{bmatrix} \sim GP\left(\begin{bmatrix} 0 \\ 0 \end{bmatrix}, \begin{bmatrix} k_{11}(x,x') & k_{12}(x,x') \\ k_{21}(x,x') & k_{22}(x,x') \end{bmatrix}\right)$$

where $k_{i,f}$ is a specific covariance function for the total covariance matrix $\underline{K}$, ARCK and DMGP use:

$$k_{11} = k_1(x_1, x_1)$$
$$k_{12} = \lambda k_1(x_1, x_2)$$
$$k_{21} = \lambda k_1(x_2, x_1)$$
$$k_{22} = \lambda_2 k_1(x_2, x_1) + k_2(x_2, x_2)$$

where $\lambda$ is an autoregressive factor, D is dimension, $k_1$ and $k_2$ are summation functions of the following form:

$$k_i(x, x') = \sigma_i^2 \exp\left(-\frac{1}{2}\sum_{d=1}^D \left(\frac{x_d - x'_d}{l_d}\right)\right)$$

The two Co-Kriging methods have different performances with the input vectors. DMGP uses a neural network as an input deformation h(x) to replace the unprocessed input vector x. Conversely, SCK and SMGP use:

$$k_{11} = a_1^2 k_1(x_1, x_1) + a_2^2 k_1(x_1, x_1)$$
$$k_{12} = a_1 b_1 k_1(x_1, x_2) + a_2 b_2 k_2(x_1, x_2)$$
$$k_{21} = a_1 b_1 k_1(x_2, x_1) + a_2 b_2 k_2(x_2, x_1)$$
$$k_{22} = b_1^2 k_1(x_2, x_1) + b_2^2 k_1(x_1, x_1)$$

because $a_i$ and $b_i$ of the covariance matrix $\underline{K}$ are hyperfunctions. Again, SMGP uses a neural network as an input transformation h(x) to replace the unprocessed input vector x. In addition, the present invention uses a sequential multi-fidelity meta-modeling (SMF) method. Basically, SMF is an optimization algorithm, which uses a specific initial sample to begin, and adds LFM and HFM samples while taking into account different sample calculation costs. Principally, the sample is added at the largest position of a reliable interval of the meta-modeling learned. Finally, we will obtain the most likely meta-modeling, which is constrained by the largest computational budget.

In sub-step T24, the optimization apparatus 114 calculates an optimal matching relationship within an increased operation range between a load of the product and its power and efficiency and simultaneously satisfying the product, so as to select an optimized operating state point in the predicted performance curve. Specifically, by means of a current performance curve, a judgement is made as to which load of current pump operation corresponds to the effiency being highest and the power being optimal, and the water pump's optimal operating point is sought from the curve, i.e. at what kind of rotation speed is the water pump's price-performance ratio highest. That is, an optimum matching relationship between rotation speed and output power and efficiency is sought, while satisfying the condition that the pressure and flow rate are within a normal working range.

Finally, step T3 is performed: the remaining service life prediction apparatus 120 establishes a cost model and an operating flexibility model of the product on the basis of the predicted performance curve, and calculates a remaining life prediction of the product according to the product's performance demands or operating costs.

In some embodiments, step T3 comprises a sub-step T31, a sub-step T32, a sub-step T33 and a sub-step T34.

In sub-step T31, the performance decline modeling apparatus 121 performs a regressive calculation on the basis of the predicted performance curve to generate a performance decline model of a water pump. In some embodiments, step T2 is performed iteratively; a historical performance curve and a current performance curve of the water pump, and a performance curve for operation of the water pump under different wear conditions, can be obtained on the basis of the predicted performance curve.

A head decline model of the pump is described, by means of a formula, as a model of head loss of a time sequence as follows:

$$P(t) = P^N - bt^c$$

where $P^N$ denotes initial performance, i.e. the design point when t=0, i.e. the performance of the water pump when it has just left the factory. b and c denote parameters used for curve fitting by the method of least squares. For example, b and c are regression parameters calculated by least squares regression of four points in the historical performance curve of the water pump.

Figure 3:
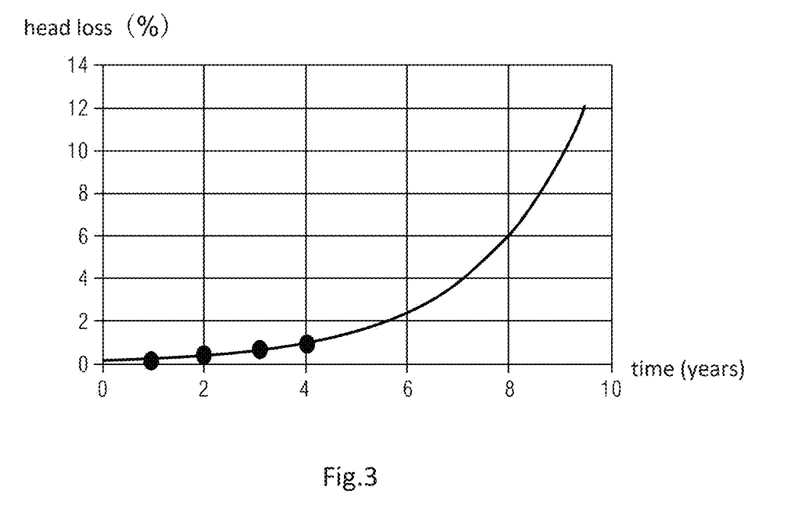
FIG. 3 is a water pump head decline curve for product state quantification and remaining life prediction according to an example embodiment incorporating teachings of the present disclosure.

Thus, as shown in FIG. 3, by continuously using historical data to perform prediction, a pump head decline curve can be obtained, of which the vertical coordinates are the water pump's head loss (%), and the horizontal coordinates are time (years). As shown in FIG. 3, as the water pump's usage time increases, the head loss value gradually and significantly increases.

In sub-step T32, the cost modeling apparatus 122 models the product cost on the basis of the performance decline model, to calculate a total life cycle economic cost of the product and a replacement cost of the product.

In some embodiments, the remaining service life is calculated through two aspects: economy, and operating flexibility. The water pump's life cycle cost (LCC) is the cost of the entire water pump life cycle, e.g. purchase, installation, operation, maintenance and processing, etc. The water pump's replacement cost (RC) is the additional cost arising from replacement of the water pump at a specific time in the future, taking into account different life cycle costs. The remaining service life considered from an economic perspective can be defined using the length of time from now to a specific future point in time, and the water pump replacement cost is lowest at this point in time.

Figure 4:
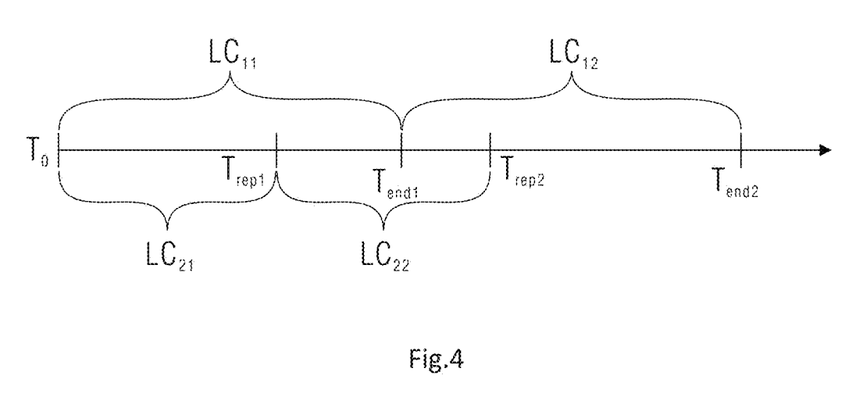
FIG. 4 is a water pump replacement old/new comparison chart for product state quantification and remaining life prediction according to an example embodiment incorporating teachings of the present disclosure.

As shown in FIG. 4, the period from time $T_0$ to $T_{end1}$ represents a first design life cycle $LC_{11}$ of an old water pump, and the period from time $T_{end1}$ to time $T_{end2}$ represents a second design life cycle $LC_{12}$ of the old water pump. The first design life cycle $LC_{11}$ and the second design life cycle $LC_{12}$ of the old water pump represent the design life of the water pump when it leaves the factory, so do not take into account actual operating conditions and wear conditions; they are idealized lives, not real lives. If the old water pump is replaced with a new water pump, then the period from time $T_0$ to $T_{rep1}$ represents a first design life cycle $LC_{21}$ of the new water pump, and the period from time $T_{rep1}$ to time $T_{rep2}$ represents a second design life cycle $LC_{12}$ of the new water pump. The first design life cycle $LC_{21}$ and second design life cycle $LC_{22}$ of the new water pump represent actual lives of the new water pump, taking into account actual operating conditions and wear conditions, so are real lives.

Specifically, the water pump life cycle cost is:

$$LCC = C_{ic} + C_{in} + C_e + C_o + C_m + C_2 + C_{env} + C_d$$

where $C_{ic}$ is the initial cost, including the prices of the water pump, system, pipelines, purchase and additional services. $C_{in}$ is the installation cost. $C_e$ is the energy cost, the predicted cost of system operation for water pump driving and control and any additional services. $C_o$ is the cost of manpower operation such as system management. $C_m$ is the maintenance and repair cost, wherein maintenance includes everyday and predictive maintenance. $C_s$ is the fault cost, e.g. production loss. $C_{env}$ is the environmental cost, e.g. removal of pollutants of accessories and liquids that are pumped out. $C_d$ is the dismantling and processing cost, including the cost of repairing the local environment and additional service processing.

Thus, the water pump replacement cost is:

$$RC = (LCC_{rep} - LCC_{original})|_{T_0}^{T_{end}} =$$
$$(C_{ic} + C_{in} + C_a + C_o + C_m + C_s + C_{env}) * \left(\frac{T_{end} - T_{rep}}{T_{rep}}\right) +$$
$$(C_{e,rep} - C_{e,original}) + (C_{res,original} - C_{res,rep})$$

where $LCC_{rep}$ is the cost of new water pump replacement, $LCC_{original}$ is the cost of the old water pump, wherein $T_{end}$ is the time when the old water pump's use cycle expires, $T_{rep}$ is the time of new water pump replacement, $C_{e,rep}$ is the energy cost of new water pump replacement, $C_{res,rep}$ is the energy cost of using the new water pump, $C_{res,original}$ is the remaining value of the old water pump, and $C_{res,rep}$ is the remaining value of the new water pump; thus, as time passes, the energy cost $C_{e,original}$ of the old water pump rises, and the energy cost $C_{res,rep}$ of the new water pump decreases. $C_{ic}$, $C_{in}$ and $C_d$ are one-time expenses. $C_o$, $C_m$, $C_s$ and $C_{env}$ are fixed expenses which continue with time. Thus, regardless of whether the water pump is replaced, these costs $C_o$, $C_m$, $C_s$ and $C_{env}$ are the same, so can be ignored.

The energy costs $C_{e,original}$ and $C_{e,rep}$ can be calculated by multiplying the energy power consumption by the price of electricity, $$C_{e,original} - C_{e,rep} =$$
$$\int_{N_{min}}^{N_{max}} \int_{Q_{min}}^{Q_{max}} \left( \int_{t_{now}+\Delta t}^{t_{end}} P_E(t, Q, N) \cdot Price_E(t) \cdot Density(Q, N) dt - \right.$$
$$\left. \int_0^{t_{end} - t_{now} - \Delta t} P_E(t, Q, N) \cdot Price_E(t) \cdot Dentiy(Q, N) dt \right) dQ \, dN$$

Density(Q,N) is the joint probability density function of the water pump flow rate Q and the rotation speed N, $P_E(t,Q,N)$ is the power updated by a power decline model at different water pump flow rates Q and rotation speeds N, $Price_E(t)$ is the predicted price of electricity with time as a variable. Cost modeling of the water pump is performed on the basis of the abovementioned algorithm.

In sub-step T33, the cost optimization apparatus 123 uses an optimization algorithm to compute the water pump replacement time, on the basis of the performance decline model and the water pump's operating data and cost parameters. That is, for the value of the pump replacement time $\Delta t$, economically the replacement cost RC is lowest or the economic benefit is highest, i.e. the replacement cost RC is minimized. The optimization algorithm includes a smart optimization algorithm, probability density function or golden section interpolation.

Specifically, operating data of the water pump includes water pump flow rate and rotation speed historical operating data, water pump transmission efficiency, and water pump click efficiency. The cost parameters include: water pump one-time costs: initial cost $C_{ic}$, installation cost $C_{in}$, dismantling and processing cost $C_d$. The water pump remaining service life is $T_{end1} - T_{now}$, wherein $T_{end1}$ represents the plant time of the old water pump's first life cycle $LC_{11}$, and $T_{now}$ represents the time now; the price of electricity.

Next, these data are substituted into the probability density function $P_r(Q,N,t)$, and the water pump's power consumption distribution and flow rate/rotation speed are obtained by analysing the historical data.

Figure 6:
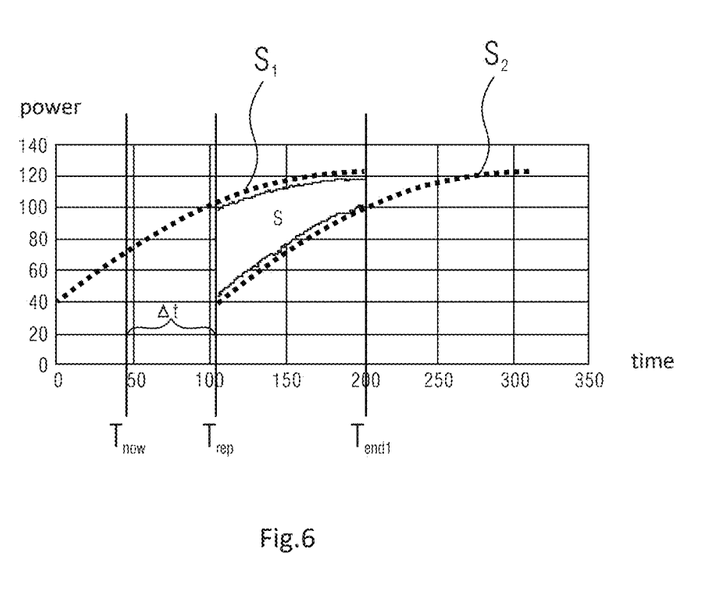
FIG. 6 is water pump power increase curves for product state quantification and remaining life prediction according to an example embodiment incorporating teachings of the present disclosure.

In order to obtain the optimal economic benefit, the remaining service life at can be calculated by using a mean optimization algorithm to minimize the water pump replacement cost. In FIG. 6, the horizontal coordinates are time, and the vertical coordinates are the water pump power. Curve Si is a water pump performance decline curve predicted at the current moment, curve Se is a performance decline curve when it is supposed that an old water pump is to be replaced with a new water pump at some future point in time, $T_{end1}$ represents the plant time of the old water pump's first life cycle $LC_{11}$, $T_{now}$ represents the time now, and $T_{rep}$ represents the time when the old water pump is replaced with the new water pump. As shown in FIG. 6, for the energy consumption part, the area S enclosed by the curves Si and S: together with $T_{rep}$ and $T_{end1}$ represents the economic benefit of replacing the old water pump with the new water pump, and the area S is maximized, indicating that greater benefit will be gained from energy savings, because the water pump performance has improved due to the replacement. Thus, the replacement cost $RC(\Delta t)$ must be minimized by means of the following function:

$$\text{Min } f(\Delta t) = RC(\Delta t)$$

In sub-step T34, the operating flexibility modeling apparatus 124 assesses the water pump's operating flexibility, i.e. the remaining service life of the water pump under extreme use conditions, on the basis of the actual requirements of water pump operation. The extreme use conditions are with full work and full load; if extreme use conditions cannot be attained with full work and full load, water pump replacement needs to be performed.

Figure 7:
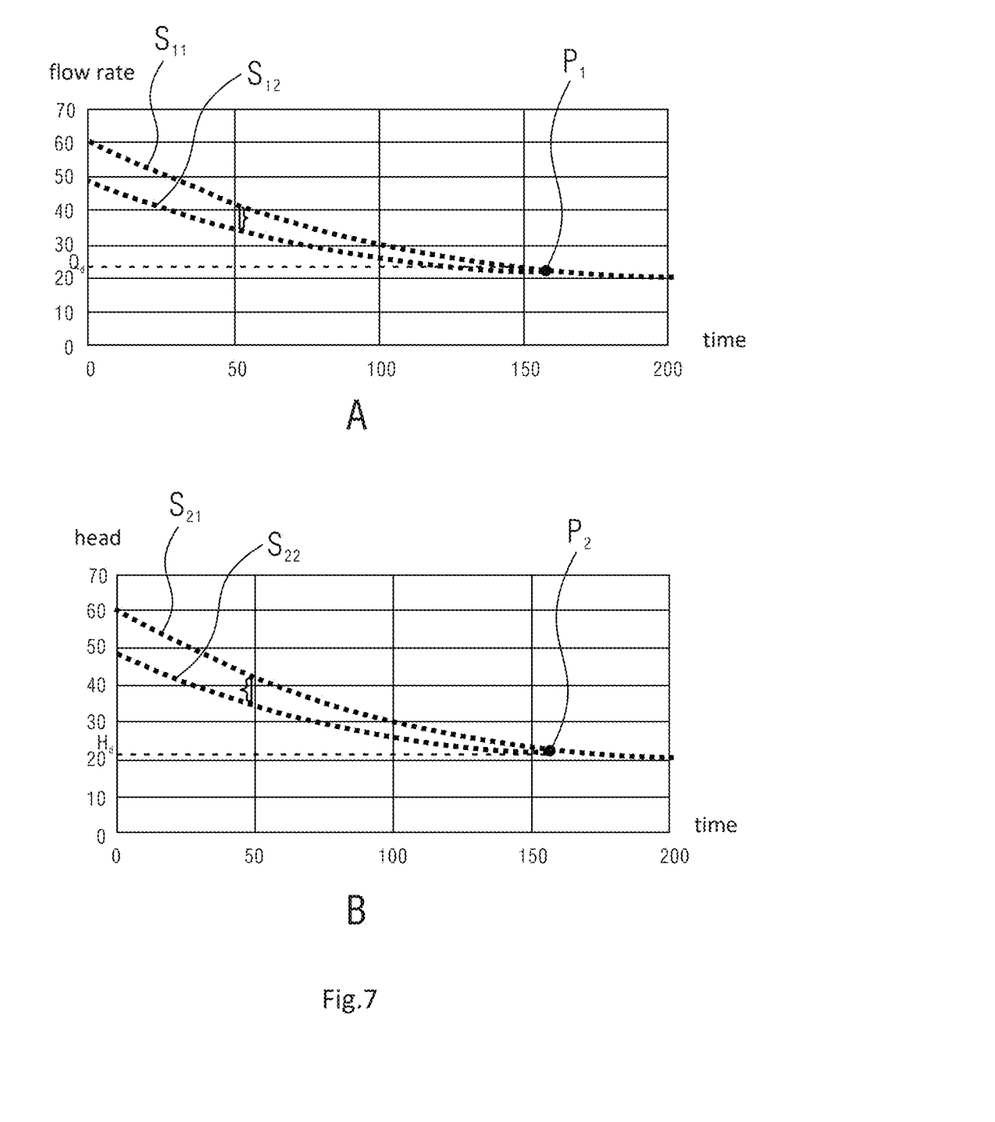
FIG. 7 is operating flexibility curves for product state quantification and remaining life prediction according to an example embodiment incorporating teachings of the present disclosure.

The data required includes the minimum demand of the water pump flow rate $Q_d$, and the minimum head demand Ha at the minimum flow rate. By substituting these data into the water pump's flow rate decline function $Q(H,N,t)$ and head decline function $H(Q,N,t)$, the operating flexibility curves shown in FIG. 7 can be obtained. As shown in FIG. 7, the vertical coordinates of graph A denote the water pump flow rate, the vertical coordinates of the lower graph denote water pump head, and the horizontal coordinates are time. Curve Su represents the water pump flow rate under full-load conditions of the water pump, curve $S_{12}$ represents the water pump flow rate for a specific head, and the dotted line represents the minimum flow rate demand $Q_d$. Curve $S_{21}$ represents the water pump head under full-load conditions of the water pump, curve $S_{22}$ represents the water pump head for a specific flow rate, and the dotted line represents the minimum head demand Ha. The zero edge points $P_1$ and $P_2$ indicate that the water pump margin is gone.

In some embodiments, the water pump is always in a dynamic substantive operation during everyday operation, in order to satisfy a load requirement of a later stage. Thus, the water pump requires some optional flexibility to respond to up/down variation of pressure and flow rate. As the water pump performance declines, the flexibility advantage will also decrease with time. Within a time period from now to a specific future point in time, the water pump performance profit is 0 at that time from head or flow demand, so the remaining service life in terms of flexibility can be defined. We define two flexibility limits :[$Q_d, H_d$]. $Q_d$ speed is the flow rate minimum requirement, $H_d$ is the minimum head demand at the minimum flow rate $Q_d$. The formulae below give optional water pump head and flow rate operating flexibility:

$$f_1(\Delta t) = |H(\Delta t) - H_d|$$
$$f_2(\Delta t) = |Q(\Delta t) - Q_d|$$

$Q_d$ is the minimum demand of flow rate, $H_d$ is the minimum head demand at the minimum flow rate, $Q(H,N,t)$ is the flow rate decline function, and $H(Q,N,t)$ is the pressure decline function.

When the operating flexibility of the water pump head or the operating flexibility of the water pump flow rate is less than a predetermined threshold, it is necessary to send a prompt that the water pump needs replaced. Preferably, when $f_1(\Delta t)$ or $f_2(\Delta t)$ is equal to 0, this indicates that the water pump needs replaced. Thus, when the formula above is 0, the operating flexibility remaining service life can be calculated. The remaining service life is calculated by these two aspects, and the final user can choose which to rotate in order to make more decisions in future, e.g. shut down the water pump or replace the water pump.

In some embodiments, a product state quantification and remaining life prediction system comprises: a processor; and a memory coupled to the processor, the memory having instructions stored therein which, when executed by the processor, cause the electronic device to perform actions comprising: T1, acquiring design data and operating data of a product; T2, establishing a design model of the product on the basis of the design data, performing data fusion according to the design data and operating data to obtain a predicted performance curve of the product, and selecting an optimized operating state point in the predicted performance curve; and T3, establishing a cost model and an operating flexibility model of the product on the basis of the predicted performance curve, and calculating a remaining life prediction of the product according to the product's performance demands or operating costs.

In some embodiments, the product is a water pump, and the action T2 further comprises the following steps: T21, subjecting design data and operating data of the water pump to data pre-processing, to remove abnormal data and erroneous data; T22, establishing a design model of the water pump on the basis of the design data, and performing design performance evaluation and analysis of the product according to the design model, wherein the design model is a multi-fidelity digital twin model; T23, using a data fusion algorithm to perform data fusion according to the design data and operating data to obtain a predicted performance curve of the product, and increasing the accuracy of the predicted performance curve by optimizing parameters of the data fusion algorithm; and T24, calculating an optimized matching relationship within an increased operation range between a load of the water pump and its power and efficiency and simultaneously satisfying the water pump, so as to select an optimized operating state point in the predicted performance curve.

In some embodiments, the action T3 further comprises: T31, performing a regressive calculation on the basis of the predicted performance curve to generate a performance decline model of a water pump; T32, modeling a cost of the product on the basis of the performance decline model, to calculate a total life cycle economic cost of the product and a replacement cost of the product; T33, using an optimization algorithm to calculate a replacement time of the water pump, on the basis of the performance decline model and the water pump's operating data and cost parameters; T34, calculating an operating flexibility of the water pump on the basis of full-load operating parameters and a decline function of the water pump.

In some embodiments, the data fusion algorithm is an MFK algorithm.

In some embodiments, the performance decline model of the pump is described, by means of a formula, as a model of head loss of a time sequence as follows:

$$P(t) = P^N - bt^c$$

where $P^N$ denotes initial performance, i.e. the design point when t=0, i.e. the performance of the water pump when it has just left the factory. b and c denote parameters used for curve fitting by the method of least squares.

In some embodiments, the total life cycle economic cost is:

$$LCC = C_{ic} + C_{in} + C_e + C_o + C_m + C_s + C_{env} + C_d$$

where $C_{ic}$ is the initial cost, $C_{in}$ is the installation cost, $C_e$ is the energy cost, $C_o$ is the system management cost, $C_m$ is the maintenance and repair cost, $C_s$ is the fault cost, $C_{env}$ is the environmental cost, and $C_d$ is the dismantling and processing cost.

In some embodiments, the replacement cost is:

$$RC = (LCC_{rep} - LCC_{original}) \Big|_{T_0}^{T_{end}}$$
$$= (C_{ic} + C_{in} + C_d + C_o + C_m + C_s + C_{env})$$
$$+ \left(\frac{T_{end} - T_{rep}}{T_{rep}}\right) + (C_{e.rep} - C_{e.original}) + (C_{res,original} - C_{res,rep})$$

where $LCC_{rep}$ is the total life cycle economic cost of new water pump replacement, $LCC_{original}$ is the total life cycle economic cost of the old water pump, wherein $T_{end}$ is the time when the old water pump's use cycle expires, $T_{rep}$ is the time of new water pump replacement, $C_{e.rep}$ is the energy cost of new water pump replacement, $C_{res,rep}$ is the energy cost of using the new water pump, $C_{res,original}$ is the remaining value of the old water pump, and $C_{res,rep}$ is the remaining value of the new water pump, wherein the energy costs $C_{e,original}$ and $C_{e.rep}$ can be calculated by multiplying the energy power consumption by the price of electricity, $$C_{e,original} - C_{e.rep} = \int_{N_{min}}^{N_{max}} \int_{Q_{min}}^{Q_{max}} \left( \int_{t_{now}+\Delta t}^{t_{end}} P_E(t, Q, N) \cdot \text{Price}(t) \cdot \text{Density}(Q, N) dt \right.$$
$$\left. - \int_{0}^{t_{end}-t_{now}-\Delta t} P_E(t, Q, N) \cdot \text{Price}(t) \cdot \text{Density}(Q, N) dt \right) dQ dN$$

where Q is the water pump flow rate, N is the water pump rotation speed, Density(Q,N) is the joint probability density function of the water pump flow rate and the rotation speed, $P_E(t,Q,N)$ is the power updated by a power decline model at different water pump flow rates and rotation speeds, and $\text{Price}_E(t)$ is the predicted price of electricity with time as a variable.

In some embodiments, the full-load operating parameters include a minimum demand $Q_d$ of the water pump flow rate and a minimum head demand $H_d$, wherein $f_1(\Delta t)$ represents the water pump head operating flexibility, and $f_2(\Delta t)$ represents the water pump flow rate operating flexibility:

$$f_1(\Delta t) = |H(\Delta t) - H_d|$$
$$f_2(\Delta t) = |Q(\Delta t) - Q_d|$$

When the water pump head operating flexibility $f_1(\Delta t)$ or the water pump flow rate operating flexibility $f_2(\Delta t)$ is less than a predetermined threshold, it is necessary to send a prompt that the water pump needs replaced.

Some embodiments include a product state quantification and remaining life prediction apparatus comprising: an acquisition apparatus, which acquires design data and operating data of a product; a fusion apparatus, which establishes a product design model on the basis of the design data, performs data fusion according to the design data and operating data to obtain a predicted performance curve of the product, and selects an optimized operating state point in the predicted performance curve; a calculation apparatus, which establishes a cost model and an operating flexibility model of the product on the basis of the predicted performance curve, and calculates a remaining life prediction of the product according to the product's performance demands or operating costs.

Some embodiments include a computer program product, tangibly stored on a computer-readable medium and comprising a computer-executable instruction which, when executed, causes at least one processor to perform one or more of the methods described herein.

Some embodiments include a computer-readable medium having stored thereon a computer-executable instruction which, when executed, causes at least one processor to perform one or more of the methods described herein.

The product state quantification and remaining life prediction mechanism described herein is reliable and precise, and can perform quantification and prediction on the basis of dynamic performance of a product. It may be especially suitable for water pumps. The teachings herein can be used to quantify the water pump's dynamic performance state on the basis of a dynamic digital model of the water pump, and can quantify the water pump's remaining service life on the basis of a water pump decline model. This can provide a product for providers of process automation solutions, or provide a value-added service package for water pump manufacturers.

Although the content of the present disclosure has been presented in detail by means of the example embodiments above, it should be realized that the above description should not be regarded as limiting the scope of the present disclosure. Various modifications and replacements will be obvious after those skilled in the art have read the above content. Thus, the scope of protection of the present disclosure should be defined by the attached claims. In addition, no reference labels in the claims should be regarded as limiting the claims concerned; the word "comprises" does not rule out other apparatuses or steps not listed in the claims or Description; words such as "first" and "second" are merely used to indicate designations, without indicating any specific order.

What is claimed is:

1. A product state quantification and remaining life prediction method, the method comprising:
    T1, acquiring design data and operating data of a product;
    T2, establishing a design model of the product on the basis of the design data, performing data fusion according to the design data and operating data to obtain a predicted performance curve of the product, and selecting an optimized operating state point in the predicted performance curve;
    T3, establishing a cost model and an operating flexibility model of the product on the basis of the predicted performance curve, and calculating a remaining life prediction of the product according to a performance demand and operating cost of the product; and
    T4, operating the product at the optimized operating state point;
    wherein step T3 comprises:
    T31, performing a regressive calculation on the basis of the predicted performance curve to generate a performance decline model of a water pump;
    T32, modeling a cost of the product on the basis of the performance decline model, to calculate a total life cycle economic cost of the product and a replacement cost of the product;
    T33, using an optimization algorithm to calculate a replacement time of the water pump, on the basis of the performance decline model, and operating data and cost parameters of the water pump; and
    T34, calculating an operating flexibility of the water pump on the basis of full-load operating parameters and a decline function of the water pump;
    wherein the total life cycle economic cost is calculated using:

$$LCC = C_{ic} + C_{in} + C_e + C_o + C_m + C_s + C_{env} + C_d$$

where $C_{ic}$ is the initial cost, $C_{in}$ is the installation cost, $C_e$ is the energy cost, $C_o$ is the system management cost, $C_m$ is the maintenance and repair cost, $C_s$ is the fault cost, $C_{env}$ is the environmental cost, and $C_d$ is the dismantling and processing cost; and wherein the replacement cost is calculated using:

$$\begin{aligned}RC &= (LCC_{rep} - LCC_{original})|_{T_0}^{T_{end}} \\ &= (C_{ic} + C_{in} + C_d + C_o + C_m + C_s + C_{env}) \\ &\quad + \left(\frac{T_{end} - T_{rep}}{T_{rep}}\right) + (C_{e.rep} - C_{e.original}) + (C_{res,original} - C_{res,rep})\end{aligned}$$

wherein $LCC_{rep}$ is the total life cycle economic cost of new water pump replacement, $LCC_{original}$ is the total life cycle economic cost of an old water pump, wherein $T_{end}$ is the time when the old water pump's use cycle expires, $T_{rep}$ is the time of new water pump replacement, $C_{e.rep}$ is the energy cost of new water pump replacement, $C_{e.original}$ is the energy cost of using the old water pump, $C_{res.original}$ is the remaining value of the old water pump, and $C_{res.rep}$ is the remaining value of the new water pump, wherein the energy costs $C_{e.original}$ and $C_{e.rep}$ are calculated by multiplying the energy power consumption by the price of electricity, $$\begin{aligned}C_{e,original} - C_{e.rep} = &\int_{N_{min}}^{N_{max}} \int_{Q_{min}}^{Q_{max}} \left(\int_{t_{now}+\Delta t}^{t_{end}} P_E(t, Q, N) \cdot \text{Price}(t) \cdot \text{Density}(Q, N) dt \right. \\ &\left. - \int_0^{t_{end}-t_{now}-\Delta t} P_E(t, Q, N) \cdot \text{Price}(t) \cdot \text{Density}(Q, N) dt \right) dQ dN\end{aligned}$$

where Q is the water pump flow rate, $Q_{max}$ is the maximum water pump flow rate, $Q_{min}$ is the minimum water pump flow rate, N is the water pump rotation speed, $N_{max}$ is the maximum water pump rotation speed, $N_{min}$ is the minimum water pump rotation speed, $t_{now}$ is the present time, $\Delta t$ is a difference between $t_{now}$ and $t_{rep}$, Density(Q,N) is the joint probability density function of the water pump flow rate and the rotation speed, $P_E(t,Q,N)$ is the power updated by a power decline model at different water pump flow rates and rotation speeds, and $\text{Price}_E(t)$ is the predicted price of electricity with time as a variable.

2. The product state quantification and remaining life prediction method as claimed in claim 1, wherein:
    the product comprises a water pump; and
    step T2 further comprises:
    T21, subjecting design data and operating data of the water pump to data pre-processing to remove abnormal data and erroneous data;
    T22, establishing a design model of the water pump on the basis of the design data, and performing design performance evaluation and analysis of the product according to the design model, wherein the design model is a multi-fidelity digital twin model;
    T23, using a data fusion algorithm to perform data fusion according to the design data and operating data to obtain a predicted performance curve of the water pump, and increasing the accuracy of the predicted performance curve by optimizing parameters of the data fusion algorithm; and T24, calculating an optimized matching relationship within an increased operation range between a load of the water pump and its power and efficiency and simultaneously satisfying the water pump, so as to select an optimized operating state point in the predicted performance curve.

3. The product state quantification and remaining life prediction method as claimed in claim 1, wherein the data fusion algorithm comprises a Multi-Fidelity Kriging algorithm.

4. The product state quantification and remaining life prediction method as claimed in claim 1, wherein the performance decline model of the pump is described in a formula, as a model of head loss of a time sequence as follows:

$$P(t) = P^N - bt^c$$

where $P^N$ denotes initial performance at a design point when t=0; and b and c denote parameters used for curve fitting by least squares.

5. The product state quantification and remaining life prediction method as claimed in claim 1, wherein the full-load operating parameters comprise a minimum demand $Q_d$ of the water pump flow rate and a minimum head demand $H_d$, wherein $f_1(\Delta t)$ represents the water pump head operating flexibility, and $f_2(\Delta t)$ represents the water pump flow rate operating flexibility according to:

$$f_1(\Delta t) = |H(\Delta t) - H_d|$$
$$f_2(\Delta t) = |Q(\Delta t) - Q_d|$$

and sending a prompt to replace the water pump when the water pump head operating flexibility $f_1(\Delta t)$ or the water pump flow rate operating flexibility $f_2(\Delta t)$ is less than a predetermined threshold.

6. A product state quantification and remaining life prediction system, the system comprising:
a processor; and
a memory coupled to the processor, the memory having an instruction stored therein which, when executed by the processor, causes the electronic device to perform actions comprising:

T1, acquiring design data and operating data of a product;
T2, establishing a design model of the product on the basis of the design data, performing data fusion according to the design data and operating data to obtain a predicted performance curve of the product, and selecting an optimized operating state point in the predicted performance curve;

T3, establishing a cost model and an operating flexibility model of the product on the basis of the predicted performance curve, and calculating a remaining life prediction of the product according to a performance demand and operating cost of the product; and T4, operating the product at the optimized operating state point;

wherein step T3 comprises:
T31, performing a regressive calculation on the basis of the predicted performance curve to generate a performance decline model of a water pump;

T32, modeling a cost of the product on the basis of the performance decline model, to calculate a total life cycle economic cost of the product and a replacement cost of the product;

T33, using an optimization algorithm to calculate a replacement time of the water pump, on the basis of the performance decline model, and operating data and cost parameters of the water pump; and T34, calculating an operating flexibility of the water pump on the basis of full-load operating parameters and a decline function of the water pump;

wherein the total life cycle economic cost is calculated using:

$$LCC = C_{ic} + C_{in} + C_e + C_o + C_m + C_s + C_{env} + C_d$$

where $C_{ic}$ is the initial cost, $C_{in}$ is the installation cost, $C_e$ is the energy cost, $C_o$ is the system management cost, $C_m$ is the maintenance and repair cost, $C_s$ is the fault cost, $C_{env}$ is the environmental cost, and $C_d$ is the dismantling and processing cost; and $$RC = (LCC_{rep} - LCC_{original}) |_{T_0}^{T_{end}}$$
$$= (C_{ic} + C_{in} + C_d + C_o + C_m + C_s + C_{env})$$
$$+ \left(\frac{T_{end} - T_{rep}}{T_{rep}}\right) + (C_{e.rep} - C_{e.original}) + (C_{res,original} - C_{res,rep})$$

wherein $LCC_{rep}$ is the total life cycle economic cost of new water pump replacement, $LCC_{original}$ is the total life cycle economic cost of an old water pump, wherein Tend is the time when the old water pump's use cycle expires, $T_{rep}$ is the time of new water pump replacement, $C_{e.rep}$ is the energy cost of new water pump replacement, $C_{e.original}$ is the energy cost of using the old water pump, $C_{res.original}$ is the remaining value of the old water pump, and $C_{res.rep}$ is the remaining value of the new water pump, wherein the energy costs $C_{e.original}$ and $C_{e.rep}$ are calculated by multiplying the energy power consumption by the price of electricity, $$C_{e,original} - C_{e.rep} = \int_{N_{min}}^{N_{max}} \int_{Q_{min}}^{Q_{max}} \left( \int_{t_{now}+\Delta t}^{t_{end}} P_E(t, Q, N) \cdot \text{Price}(t) \cdot \text{Density}(Q, N) dt \right.$$
$$\left. - \int_0^{t_{end}-t_{now}-\Delta t} P_E(t, Q, N) \cdot \text{Price}(t) \cdot \text{Density}(Q, N) dt \right) dQ dN$$

where Q is the water pump flow rate, $Q_{max}$ is the maximum water pump flow rate, $Q_{min}$ is the minimum water pump flow rate, N is the water pump rotation speed, $N_{max}$ is the maximum water pump rotation speed, $N_{min}$ is the minimum water pump rotation speed, $t_{now}$ is the present time, $\Delta t$ is a difference between $t_{now}$ and $t_{rep}$, Density(Q,N) is the joint probability density function of the water pump flow rate and the rotation speed, $P_E(t,Q,N)$ is the power updated by a power decline model at different water pump flow rates and rotation speeds, and $Price_E(t)$ is the predicted price of electricity with time as a variable.

7. The product state quantification and remaining life prediction system as claimed in claim 6, wherein:
the product comprises a water pump; and
the action T2 further comprises:
T21, subjecting design data and operating data of the water pump to data pre-processing to remove abnormal data and erroneous data;
T22, establishing a design model of the water pump on the basis of the design data, and performing design performance evaluation and analysis of the product according to the design model, wherein the design model is a multi-fidelity digital twin model;
T23, using a data fusion algorithm to perform data fusion according to the design data and operating data to obtain a predicted performance curve of the water pump, and increasing the accuracy of the predicted performance curve by optimizing parameters of the data fusion algorithm; and
T24, calculating an optimized matching relationship within an increased operation range between a load of the water pump and its power and efficiency and simultaneously satisfying the water pump, so as to select an optimized operating state point in the predicted performance curve.

8. The product state quantification and remaining life prediction system as claimed in claim 6, wherein the data fusion algorithm comprises a Multi-Fidelity Kriging algorithm.

9. The product state quantification and remaining life prediction system as claimed in claim 6, wherein the performance decline model of the pump is described in a formula, as a model of head loss of a time sequence as follows:

$$P(t) = P^N - bt^c$$

where $P^N$ denotes initial performance at a design point when t=0; and b and c denote parameters used for curve fitting by least squares.

10. The product state quantification and remaining life prediction system as claimed in claim 6, wherein the full-load operating parameters comprise a minimum demand $Q_d$ of the water pump flow rate and a minimum head demand $H_d$,
wherein $f_1(\Delta t)$ represents the water pump head operating flexibility, and $f_2(\Delta t)$ represents the water pump flow rate operating flexibility according to:

$$f_1(\Delta t) = |H(\Delta t) - H_d|$$
$$f_2(\Delta t) = |Q(\Delta t) - Q_d|$$

and sending a prompt to replace the water pump when the water pump head operating flexibility $f_1(\Delta t)$ or the water pump flow rate operating flexibility $f_2(\Delta t)$ is less than a predetermined threshold.

* * * * *